United States Patent [19]
Cerroni

[11] 4,303,421
[45] Dec. 1, 1981

[54] DECANTATION CYCLONES

[76] Inventor: Manlio Cerroni, Via Bruxelles, 53 Roma, Italy

[21] Appl. No.: 130,432

[22] Filed: Mar. 14, 1980

[30] Foreign Application Priority Data

Mar. 16, 1979 [IT] Italy ................. 48393 A/79

[51] Int. Cl.³ ............................. B01D 46/04
[52] U.S. Cl. ....................... 55/290; 55/302; 55/337; 55/351; 55/400; 55/459 R
[58] Field of Search ........... 55/302, 337, 320, 400, 55/459 R, 290, 351; 406/171-173

[56] References Cited

U.S. PATENT DOCUMENTS

| | | | |
|---|---|---|---|
| 1,043,551 | 11/1912 | Thurman | 55/290 |
| 1,493,789 | 5/1924 | Mullen | 55/290 |
| 3,183,647 | 5/1965 | Lang | 55/290 |
| 4,120,674 | 10/1978 | Haas et al. | 55/302 |

FOREIGN PATENT DOCUMENTS

| | | | |
|---|---|---|---|
| 2401342 | 2/1975 | Fed. Rep. of Germany | 55/302 |
| 78997 | 1/1971 | German Democratic Rep. | 55/459 R |
| 326148 | 1/1958 | Switzerland | 406/171 |
| 609003 | 2/1979 | Switzerland | 55/290 |

Primary Examiner—Bernard Nozick
Attorney, Agent, or Firm—Silverman, Cass & Singer

[57] ABSTRACT

An improvement in a decantation cyclone, particularly for the separation of air from material which is light and has a relatively large surface by means of a grid having relatively wide meshes rotatable about an axis which is perpendicular to the plane in which the grid itself lies. The rotation of the grid causes the gradual and continuous displacement of the grid sector from one position which is situated below the mouth of the air-drawing tubing to a rest position.

8 Claims, 3 Drawing Figures

DECANTATION CYCLONES

BACKGROUND OF THE INVENTION

It is known that cyclones are employed at the end of pneumatic conveyor plants for the separation of the air from the conveyed material. The separation may be more or less perfect as a function of the transported material and, anyway, normally the separated air drags with itself small portions of the material itself, without causing particular problems since that air can be safely filtered after its exit from the cyclone.

When materials are pneumatically transported which are light and have a relatively large size, such as plastic in film, it may happen, however, that because of air vortices or other, some sheets, even having a relatively large size, will exit from the cyclone together with the air, and such an occurrence will create extremely serious problems, both if this material will reach the electric exhaust fan and if it will reach the filter. It is obvious, indeed, that the material reaching into the electric exhaust fan will cause damages to the electric exhaust fan itself and, if it will reach the filter, the material could arrange itself in such a way to obstruct completely the filter, so stopping the passage of the air.

These drawbacks cause the shutdown of the plant and the corresponding prolongation of the working schedule, with consequences which are, also from this standpoint, economically heavy.

SUMMARY OF THE INVENTION

An object of the present invention is an improvement to the decantation cyclones of the aboveindicated type and, particularly, to the cyclones which are intended to effect the separation of air from materials which are light and of a relatively large surface, this improvement obviating the drawbacks themselves and rendering safe and continuous the operation of the cyclone.

It will be recalled that the cyclone is a device which is substantially formed by a cylinder which, at its lower portion, ends as a cone, by a tubing which is tangential in respect to the cylinder, and through the air-material mix enters, and by a central upper tubing which starts from the top cylinder closing portion, and through which the air exits. Normally, but not necessarily, at the end portion of the abovementioned cone a rotary star valve or similar is arranged, this valve having the purpose of permitting the passage only of the exiting material, without allowing the entering or exiting of air, according to the circumstance that the cyclone is in a depression or in a compression phase.

According to the invention, the improvement consists in prearranging, before the air passes into the exit or outlet tubing, a periodically or continuously movable interception member, through which the air, possibly laden with residual materials, passes depositing these materials, and arranging things so that the sediments which pile up upon this intercepting member will be carried away, by virtue of the mobility itself of the intercepting member, from the main outlet region of the air, and will be let fall again inside the cyclone. In particular, the interception member is constituted by a grid, preferably of a rotary type, which is arranged at the upper portion of the cyclone, directly under the roof of the cyclone itself, the said grid effecting, therefore, a kind of pre-filtering action in respect to the air, while this exits from the overlying tubing.

According to the invention, the grid or interception member is preferably provided with a rotary motion so that it will periodically bring sectors of the grid itself out of reach of the direct action of the air outlet upper tubing, so that it will permit the falling of the material which has been possibly retained by the grid itself.

It is to be observed that this intercepting member, preferably when it is out of the range of direct action by part of the air removing tubing, is subjected to a cleaning action, this cleaning taking place by the action of the force of gravity or through a passage of supplementar air which is directly delivered by the cyclone or by an external blower, this supplementar air having a head which is sufficient to cause the separation of the materials, which have stuck to the surface of the grid, from the grid itself.

According to a further modification of the invention, below the interception member, within the cyclone body, a preferably fixed collar is arranged, said collar being in the shape of a truncated cone or having a plane shape, which prevents the material, (possibly rising the cyclone wall by the action of the centrifugal force) reaching the proximity of grid and being dragged in correspondence of the outlet region for the air, such collar having the function of deflecting the materials downwards, so that it is forwarded towards the discharge.

DESCRIPTION OF THE PREFERRED EMBODIMENT

Figure 1:
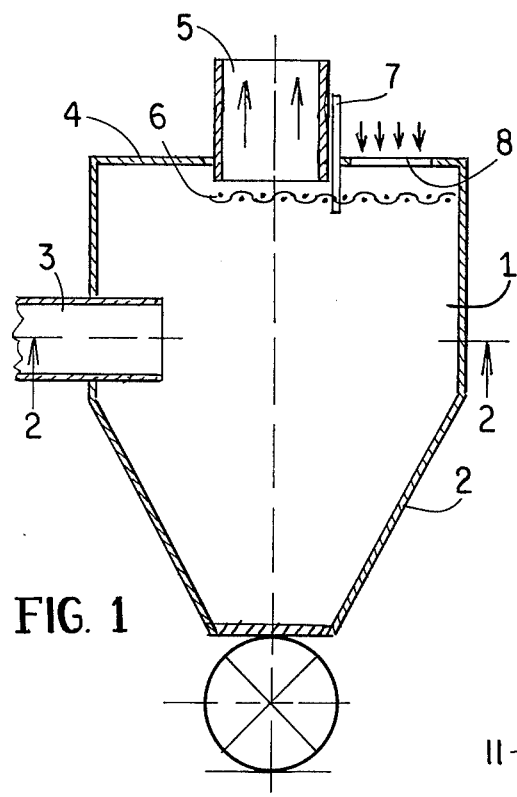
FIG. 1 shows schematically a cyclone, represented according to a vertical section, said cyclone being provided with the improvements of the invention.
Figure 2:
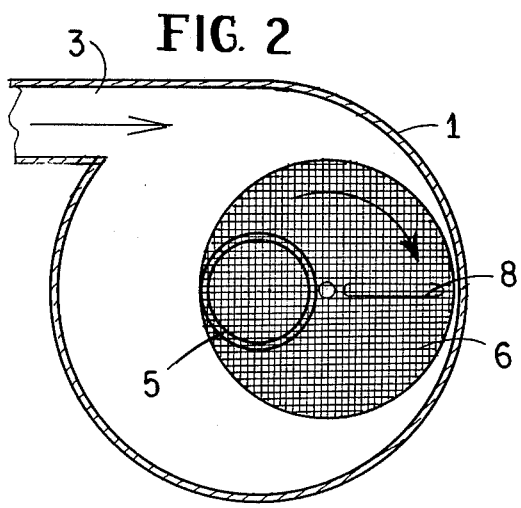
FIG. 2 shows, in a horizontal section, of the cyclone of FIG. 1.

With reference to said drawing, and in particular to the FIGS. 1 and 2, it can be observed how a cyclone is formed by a cilindrical body 1 which is shaped as a truncated cone 2 in its lower portion, within said cylindrical body 1 tangentially reaching a tubing 3 for the inlet of air and material to be separated. Superiorly the cyclone is limited by a surface 4, from which, in a concentric position, the air exit tubing 5 protrudes.

According to the invention, below the roof 4 of the cyclone, at its upper portion, and in correspondence of the exit tubing 5, a movable grid 6 is foreseen, which is interposed between the flow of ascending air, which is directed toward the exit tubing 5 and the remaining portion of the cyclone body. By the effect of the presence of said grid 6, it is achieved the result that the air, which may drag with itself a light and large-sized material, will pass, before exiting through the tubing 5, through the grid, and, therefore, it will deposit all that material which, if it were able to reach the electric exhaust fan or the filter, could cause damages to the last-named devices.

Were the grid 6 of a fixed type, it would be necessary to effect periodically its substitution or cleaning, given the fact that the materials dragged by the air would show a trend to obstruct or clog the holes. According to the invention, it is foreseen that the grid 6 is rendered movable and, in the embodiment which is illustrated in FIGS. 1 and 2, the grid itself is provided with a rotary movement about an axis 7. It is obvious that, owing to the rotation of the grid 6, the portion of the grid itself which happens to be in correspondence with the tubing 5, will vary continuously and, by the effect of said mobility, it will exit out of the range of action of the tubing 5 to reach a region of relative "rest".

As previously mentioned, a requirement expected from these cyclones is the ability to work according to a continuous duty-cycle and, just in view of this end, the introduction is foreseen of an intercepting member of the type of grid 6. It is, however, necessary, when the portion of grid 6 is obstructed by the presence of material, to clean the grid 6 itself and this is done, according to the invention, by virtue of an automatic system since, when the grid 6 reaches a point which is out of the influence region of the tubing 5, the grid itself will pass under a supplemental air orifice 8, through which the air is made to pass through the surface of the grid in a direction which is opposed to that of the working flow, so causing the removal, from that last-named surface, of all the material which, in any way, may have adhered to that surface. In other words, we get a self-cleaning device, so that the air jet will sweep away the material which has stuck and will throw it again downwards, and this air jet can be created without supplemental injection (or blowing in) when the cyclone works along a depression phase of the cycle, or else said jet is activated by means of a small supplemental electric fan in the case that the cyclone is working in a compression phase.

A grid has been mentioned and it has been indicated that this grid is rotating about its own axis 7. In effects, the grid could assume other aspects and could be movable in other ways, what is important being the purpose of removing from the influence region of the tubing 5 the section of grid which has worked, substituting it by a section of grid which has been cleaned.

It happens very often that, within the cyclone, a downy material is present which has been transported together with the other material, and that this downy material, because of its lightness, will be dragged along the walls, by virtue of the centrifugal force, towards the high portion of the cyclone, so contacting the above-mentioned grid. When this happens, the downy material is carried by the grid itself in correspondence with the outlet orifice of the air and is dragged outwards, so causing the worsening of the solid charge within the exiting air and causing, therefore, problems in the filter.

In order, to avoid this, according to a further solution of the problem, below the gride a collar is arranged which has the shape of a truncated cone 10, said collar, while contacting the cylindrical walls 1 of the cyclone at their outside skirt, presenting a large, downwards directed, opening 11. Said collar, having a truncated cone shape or a flat shape, blocks, therefore, the material rising along the walls of the cyclone, and conveys it again towards the lower portion of the cyclone, so that this material will be forwarded towards the exhaust together with the other material. It is seen that, in this way, a cyclone is completed and improved which, already by itself being improved in the way which has been illustrated in FIGS. 1 and 2, presents remarkable advantages in respect to the conventional cyclones.

Figure 3:
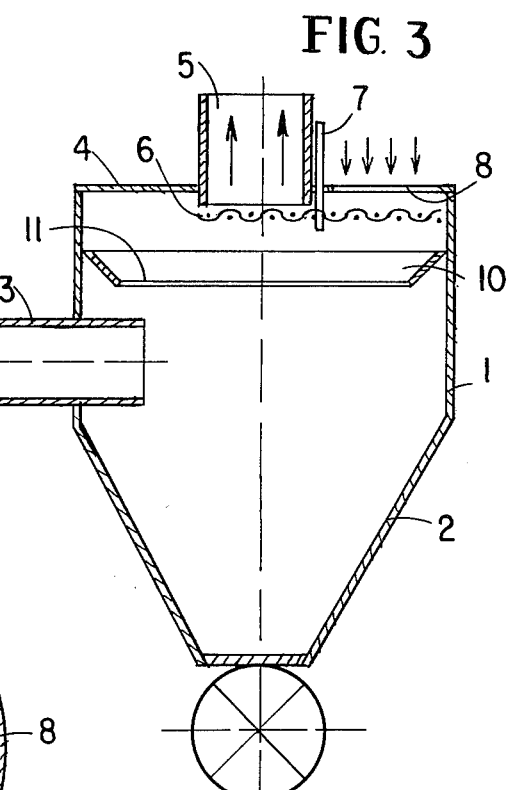
FIG. 3 shows a view, in a longitudinal section, of a further embodiment of the cyclone.

It is suitable, now, to point out that this, thus improved, cyclone, both as represented in FIGS. 1 and 2, and as indicated in FIG. 3, is particularly intended for employment in the cases in which the air drags necessarily elements having various sizes, also of large surface, of a light material, as plastic in film or similar, which, owing to their nature, if they were not checked by the cyclone and were to reach the electric fan or strike the filter, could cause damages to the plant or would stop it, and which, in any case, would oblige to stop the operation of the plant to allow for a cleaning operation. This is particularly the case when in the cyclone materials are handled which come from the selective recovery of the still utilizable materials which are contained in the town solid waste, but the employment of the cyclone of the invention obviously is not limited to this single field.

What is claimed is:

1. A decantation cyclone for the separation of air from solid material including lightweight sheet paper and sheet plastic transported thereby wherein the cyclone includes a cylindrical hollow body having a roof and floor, an inlet opening tangentially to the interior of said body, an outlet formed in the roof, movable filter means within the body and arranged adjacent the outlet and spaced from the inlet to intercept flow from the interior of the body through the outlet, whereby to intercept the lighter solids carried by said air prior to entry thereof into the outlet preventing blockage thereof, said filter means comprising a grid having a relatively large mesh size, said grid comprising a disc-like filter arranged in a plane transverse the outlet and being movable rotatably transverse the outlet about an axis offset from the axis of the outlet, means for rotating said grid in said plane and air intake means located offset from said outlet radially of the axis of rotation of said grid to backflush the disc-like filter driving any intercepted material thereon toward the floor of the hollow body.

2. The apparatus as claimed in claim 1 and said means for back flushing the grid with air flow located at a location subsequent to passage of each sector past the outlet.

3. The apparatus as claimed in claim 1 wherein said grid is mounted for rotatable movement about an axis perpendicular to the plane in which the grid is disposed whereby gradually continuously to displace each grid sector from a position intercepting the flow through the outlet at the entry thereto to a position offset therefrom.

4. The apparatus as claimed in claim 1 and a collar formation provided interior of the body and below the grid, said collar having a truncated conical configuration, the major base thereof facing the upper end of said body and fixed by adhering to the surface of the interior wall of the body, the minor base also having a relatively large diameter whereby to prevent any downy material from dragging along the interior wall of said body toward the outlet.

5. A decantation cyclone for the separation of air from solid material including lightweight sheet paper and sheet plastic transported thereby wherein the cyclone includes a cylindrical hollow body having a roof and floor, an inlet opening tangentially to the interior of said body, an outlet formed in the roof, movable filter means within the body and arranged adjacent the outlet and spaced from the inlet to intercept flow from the interior of the body through the outlet, whereby to intercept the lighter solids carried by said air prior to entry thereof into the outlet preventing blockage thereof, said filter means comprising a grid having a relatively large mesh size, said grid comprising a disc-like filter arranged in a plane transverse the outlet and being movable rotatably transverse the outlet about an axis offset from the axis of the outlet and radial air intake means for directing air flow to the grid from a direction opposite the air flow directed through the outlet and into the cyclone location along a line radially of the axis of rotation of the grid and displaced from the outlet whereby each sector is back flushed with air flow immediately subsequent to leaving the location of the outlet whereby to dislodge therefrom any intercepted material held thereby.

6. The apparatus as claimed in claim 5 wherein said grid is mounted for rotatable movement about an axis perpendicular to the plane in which the grid is disposed whereby gradually continuously to displace each grid sector from a position intercepting the flow through the outlet at the entry thereto to a position offset therefrom.

7. The apparatus as claimed in claim 5 and a collar formation provided interior of the body and below the grid, said collar having a truncated conical configuration, the major base thereof facing the upper end of said body and fixed by adhering to the surface of the interior wall of the body, the minor base also having a relatively large diameter whereby to prevent any downy material from dragging along the interior wall of said body toward the outlet.

8. The apparatus as claimed in claim 5 and said means for back flushing the grid with air flow at a location subsequent to passage of each sector past the outlet comprise radial air intake means formed as an elongate radial slit formed in the roof of said body.

* * * * *